March 7, 1939.  J. MUROS  2,149,403
SHAVING IMPLEMENT
Filed Jan. 25, 1937
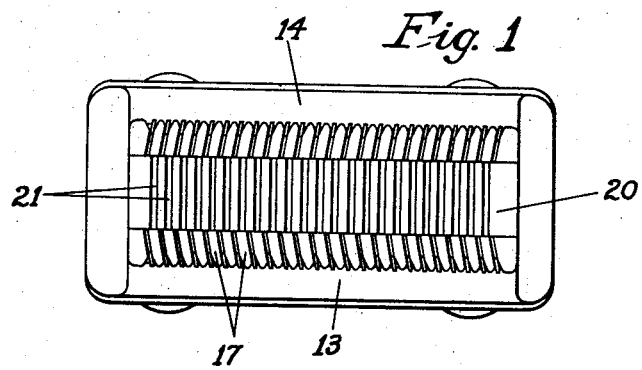
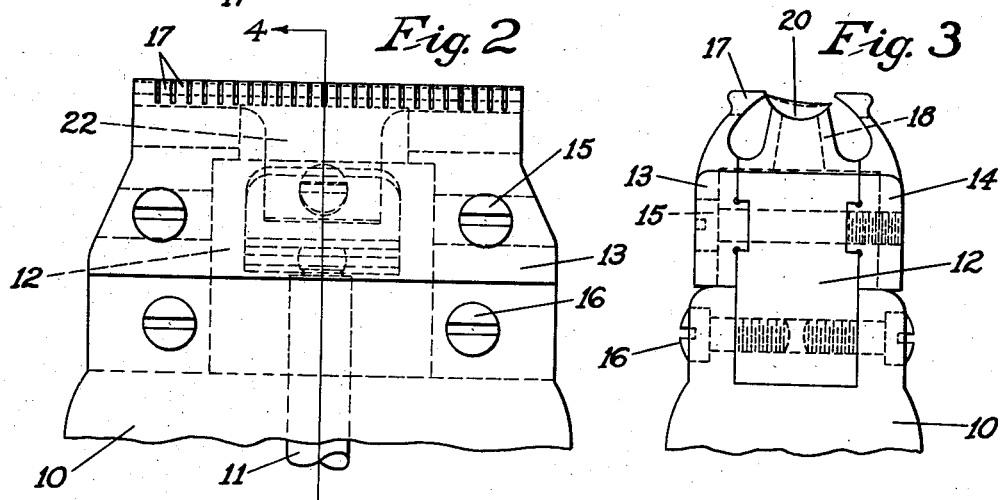
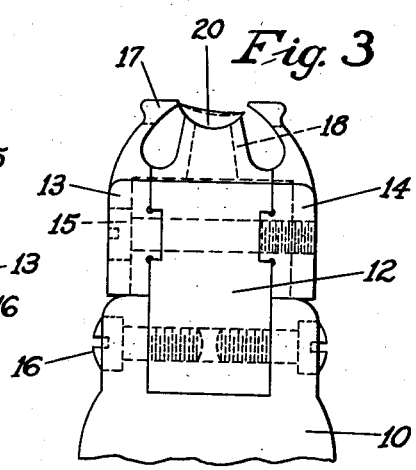
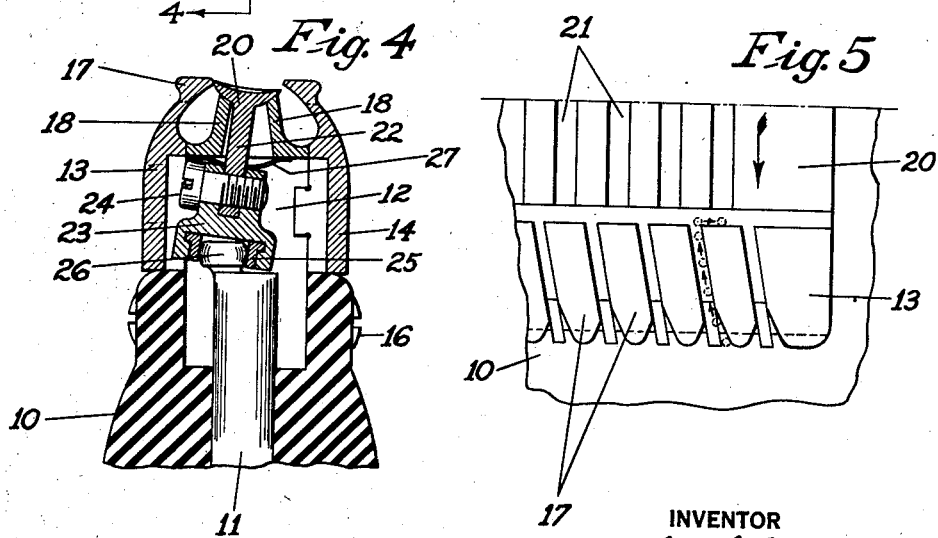
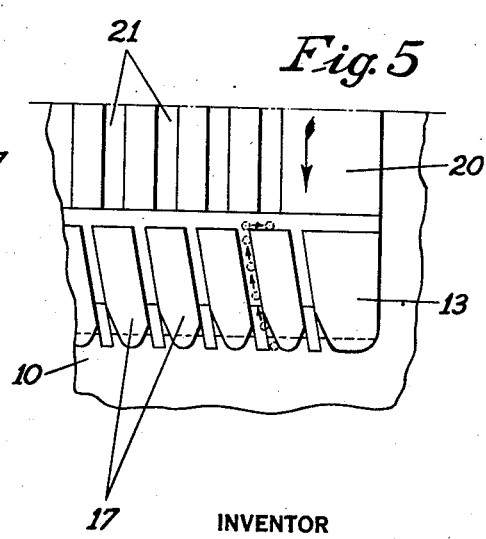
INVENTOR
Joseph Muros.
BY
ATTORNEY Patented Mar. 7, 1939

2,149,403

UNITED STATES PATENT OFFICE 2,149,403

SHAVING IMPLEMENT

Joseph Muros, Cambridge, Mass., assignor to Gillette Safety Razor Company, Boston, Mass., a corporation of Delaware Application January 25, 1937, Serial No. 122,127

9 Claims. (Cl. 30—43)

This invention relates to implements employing co-operating cutting or shearing members for dry shaving, that is to say, shaving without the use of lather. In one aspect the invention consists in improvements upon implements of the type disclosed in my co-pending application, Serial No. 112,516, filed November 24, 1936, now Patent No. 2,119,998, June 7, 1938. In another aspect it consists in improvements which may be advantageously employed in any dry shaving implement having opposed cutting edges of substantial length.

The general object of my invention is to improve the efficiency of dry shaving implements by facilitating the passage of hairs to shearing positions in the implement. To this end an important feature of the invention consists in a guard member having a series of transverse hair-deflecting grooves through which the hairs may pass when the implement is moved across the face of the user. I have discovered that by arranging these grooves obliquely or at a lateral inclination to the line of the shearing edge the individual hairs in passing through the passages are deflected from their normal position while they remain within the grooves or are controlled by the walls of the grooves. Then, upon being released, they immediately move out of registration with the end of the groove through which they have passed and assume a position opposite to a portion of the shearing edge. In such position they may be engaged and severed by the movement of a co-operating cutter. It will be seen that if the grooves extend at right angles to the cutting edge there is no tendency to deflect hairs passing through them and consequently such hairs merely stand opposite the openings of the grooves where they may be pushed back into the grooves by the approaching movement of the cutter edge. This is avoided in accordance with the present invention, since immediately upon passing out of an inclined groove the hairs will move naturally and of their own resiliency away from the opening of the groove and into an advantageous shearing position.

I have found it desirable to devote about one-fifth of the length of the effective shearing edge to such inclined guide grooves and the increased number of hairs conducted by the grooves into shearing position has been found substantially to increase the general efficiency of the implement as compared to one having no such grooves.

My invention is herein shown in an implement comprising a guard member having opposed cutting edges and a rocking cutter located between them and having co-operating oppositely directed cutting edges. Considering this type of cutter, a further feature of my invention consists in providing the face of the cutter with a series of guide grooves arranged out of line with the groove-openings of the guard member and opposite to solid sections of its cutting edge. Thus the hairs which reach the cutter are guided in the movement of the implement to a shearing position instead of an unsupported position where they might be merely deflected back into the groove-openings instead of being sheared.

These and other features of the invention will be best understood and appreciated from the following description of a preferred embodiment thereof, selected for purposes of illustration and shown in the accompanying drawing, in which:—

Fig. 1 is an end view of the implement on an enlarged scale;

Fig. 2 is a similar view in front elevation, portions of the casing being shown as broken away;

Fig. 3 is a corresponding view in side elevation;

Fig. 4 is a view in cross-section on the line 4—4 of Fig. 2; and

Fig. 5 is a fragmentary end view on a still larger scale.

The implement includes in its structure a casing 10 of moulded material, such as "Bakelite", which is shaped to serve as a handle and also as a housing for a small motor of which only a portion of the shaft 11 is shown. The casing is formed at its upper end with spaced flanges to receive the metallic head of the implement. This comprises an elongated central member 12 to which are rigidly secured smaller side members 13 and 14 by means of transverse screws 15. These screws are seated in recesses formed in the side member 13, pass through the central member 12 and are threaded into the side member 14. The position of these three members is accurately determined by longitudinal tongue and groove connections shown in Fig. 3. The main member 12 of the head is cut away centrally in a large rectangular chamber and is provided in its upper side with two upstanding converging flanges 18 in the upper ends of which is formed a cylindrical seat extending longitudinally of the implement. This member is securely held between the flanges of the casing 10 by transverse screws 16, two arranged on each side of the chamber and threaded into the member.

The side members 13 and 14 have the function of guards and supply the stationary shearing teeth of the implement. To this end each member is provided at its upper edge with a flat top inwardly extending flange and these flanges are provided with a series of transversely inclined or oblique slots forming individual teeth 17. The outer ends of these teeth are rounded so that they may be moved smoothly over the face of the user with a combing effect and have divergent walls at their outer ends so that the hairs encountered in the movement of the implement are guided into the inclined grooves. The straight inner edge of each tooth 17 supplies a shearing edge, each side member thus having a shearing edge interrupted by the spaced laterally or transversely inclined grooves already mentioned, or to put it differently, an edge comprising spaced shearing edge portions.

The movable cutter element of the implement has oppositely arranged shearing edges arranged to co-operate with the stationary shearing edges of the teeth 17. It comprises an elongated segmental portion 20 having a lower cylindrical face which is arranged to support the cutter for rocking movement in the cylindrical seat formed in the flanges 18 of the member 12. The cutter is also provided with a wide downwardly extending stem or shank 22 which is rigidly secured by a screw 24 to an elongated connecting piece 23. The connecting piece 23 has an elongated guideway formed in its lower face in which is received a flanged sliding block 25. The block 25 is centrally perforated to receive an eccentric head 26 which is formed on the end of the motor shaft 11. Rotation of the motor shaft, therefore, transmits to the cutter a rapid, transverse vibration or oscillation, the longitudinal component of movement of the eccentric head 26 being dissipated as lost motion between the slide block 25 and the connecting piece 23 of the cutter. A leaf spring 27 surrounds the shank 22 of the cutter and is held under compression between the top of the connecting piece 23 and the roof of the chamber in the main member 12 below the flanges 18. The cylindrical portion of the cutter is thus held firmly upon its seat. The amplitude of movement imparted to the cutter in the rotation of the shaft 11 is sufficient to move the longitudinal shearing edges of the cutter alternately into shearing engagement with the shearing edges of the guard teeth 17. The upper surface of the cutter is provided with a series of parallel grooves 21 and these are disposed opposite to the shearing edges presented by the teeth 17, that is, out of line with the grooves defining the teeth 17. The grooves 21 are of maximum depth at the center of the cutter and taper out toward each edge of the cutter.

When the implement is to be used the motor is started and a continuous vibration at high speed is imparted to the cutter 20 as already explained. The implement is in the meantime moved over the face of the user and the behavior of the hair is graphically indicated in Fig. 5. In this figure it is assumed that the implement as a whole is being moved downwardly, as indicated by the arrow, and that a hair is engaged by the second tooth 17 from the right as indicated in dotted lines. The hair will be first deflected by the diverging edge of the tooth toward the left. As the motion of the implement continues, the deflection of the hair is increased until it passes completely through the oblique grooves into which it has entered.

Immediately upon being released from the guiding action of the groove, the hair snaps toward the right, as seen in Fig. 5, into a position directly in front of the shearing edge of the adjacent tooth, that is, the hair moves longitudinally with respect to the implement to a position in which it is backed up by a shearing-edge section. In this position it remains until the cutter is oscillated into shearing engagement with the stationary shearing edges of the side member 13 whereupon the hair is cut off close to the skin and falls into the waste space which is formed for that purpose between the outer walls of the flange portions 18 and the inner walls of the detachable portions 13 and 14 below the teeth 17.

The transverse grooves 21 of the cutter member are deepest in the center of the cutter and run out substantially flush with the cutter surface at both ends. Their function is to guide any hairs which may reach the cutter into shearing position with respect to the teeth 17 as the cutter is moved, thus tending to keep hairs from reaching positions registering with the grooves of the guard members where they would find no supporting shearing edges.

It will be apparent from the foregoing description that the implement has two complete sets of shearing elements and will operate in whatever direction it is moved across the face of the user. Moreover, both sets are always in a receptive condition so that the hair encountered is efficiently guided into shearing position whatever may be the direction of movement of the implement.

It will be noted also that the upper face of the cutter 20 is slightly dished or concaved in a transverse sense and that the shaving edges thereof pass above the ends of the teeth 17. The curvature of the cutter approximates the natural curvature of the skin when the implement is pressed endwise against the face. Therefore, the actual cutting operation takes place in the zone in which the skin is deflected into the recessed end of the implement where there is no interposed grill or guard between the skin and the shearing point. This arrangement results in a particular close shaving effect since the length of the stubble is reduced to a minimum.

Having thus disclosed my invention and described a preferred embodiment thereof by way of illustration but not limitation, I claim as new and desire to secure by Letters Patent:—

1. An implement of the class described comprising a guard movable across the face and shaped to deflect hairs engaged thereby transversely to the line of movement of the implement, and to release the hairs in a predetermined location, the guard having a shearing edge located to back up the hairs in their released positions, and a co-operating shearing member.

2. An implement of the class described comprising a guard movable across the face and having oblique grooves therein for deflecting hairs transversely to the line of movement of the implement, the guard having shearing edges into registration with which the hairs move transversely upon passing beyond the grooves, and a co-operating shearing member.

3. An implement of the class described including a rocking cutter having oppositely disposed edges, and a stationary member having co-operating shearing edges located on opposite sides of the cutter and interrupted by grooves extending at an inclination thereto through which hairs may move into positions at the shearing edges.

4. An implement of the class described including an oscillating cutter having a continuous shearing edge, and a stationary member having shearing edge sections defined by oblique grooves, the latter acting to deflect hairs as they approach shearing position and to release the hairs for movement into line with said edge sections.

5. An implement of the class described including a vibratory cutter having continuous shearing edges, and a stationary member having edge sections arranged at either side of the cutter and having hair deflecting grooves leading obliquely thereto.

6. An implement of the class described including a vibratory cutter having oppositely directed shearing edges, and a stationary member having opposed shearing edges interrupted by spaces, said cutter having guide grooves out of line with said spaces.

7. An implement of the class described having a guard face with grooves therein opening through a shearing edge, and a movable cutter having a co-operating shearing edge and guide grooves terminating at said edge and being located opposite to uninterrupted portions of the shearing edge of the guard.

8. An implement of the class described comprising an oscillatory cutter having continuous shearing edges and a concave upper face, and a stationary member having opposed edges arranged at either side of the cutter and divided into sections by oblique guide grooves, the shearing edges of the cutter being so located as to meet said sections where the skin of the user is curved into approximate conformity to the concave face of the cutter.

9. An implement of the class described comprising a movable cutter having a continuous shearing edge, and a guard member with a co-operating edge divided by oblique grooves into approximately four parts solid cutting edge and one part groove opening.

JOSEPH MUROS.